United States Patent [19]

Kirchhoff et al.

[11] Patent Number: 5,044,861
[45] Date of Patent: Sep. 3, 1991

[54] GARBAGE-COLLECTING TRUCK HAVING A REPLACEABLE CONTAINER WHICH IS RECIRPROCABLY MOUNTED ON A TILTABLE FRAME

[75] Inventors: Johannes Kirchhoff, Iserlohn; Georg Sandkuhler, Hemer, both of Fed. Rep. of Germany

[73] Assignee: Edelhoff Polytechnik GmbH & Co., Iserlohn, Fed. Rep. of Germany

[21] Appl. No.: 607,202

[22] Filed: Oct. 31, 1990

Related U.S. Application Data

[63] Continuation of Ser. No. 370,332, Jun. 22, 1988, abandoned.

[30] Foreign Application Priority Data

Jun. 22, 1988 [DE] Fed. Rep. of Germany ....... 3821094
Nov. 29, 1988 [DE] Fed. Rep. of Germany ....... 3840246

[51] Int. Cl.$^5$ ............................................. B60P 1/64
[52] U.S. Cl. .................................... 414/332; 414/498; 414/919; 414/491; 298/22 C; 298/14
[58] Field of Search .................. 298/22 C, 12, 14; 414/332, 480, 477, 478, 498, 499, 500, 919, 21, 491, 492, 493, 494

[56] References Cited

U.S. PATENT DOCUMENTS

| | | | |
|---|---|---|---|
| 1,985,169 | 12/1934 | Howell et al. | 414/498 X |
| 3,071,926 | 1/1963 | Olson et al. | |
| 3,399,795 | 9/1968 | Clucker et al. | 414/500 |
| 3,462,033 | 8/1969 | Pioch | |
| 3,857,504 | 12/1974 | Bausenbach et al. | 414/500 |

FOREIGN PATENT DOCUMENTS

| | | | |
|---|---|---|---|
| 264925 | 4/1988 | European Pat. Off. | 414/332 |
| 3526209 | 1/1987 | Fed. Rep. of Germany | 414/919 |
| 3636037 | 4/1988 | Fed. Rep. of Germany | |
| 3708066 | 9/1988 | Fed. Rep. of Germany | 414/498 |
| 131435 | 10/1981 | Japan | 414/477 |
| 2146003 | 4/1985 | United Kingdom | |

OTHER PUBLICATIONS

EPO Search Report of 4/20/90.
German Patent Office Action of 4/6/90.
DIN ISO 1219 of 8/19/78, p. 11.

Primary Examiner—Frank E. Werner
Attorney, Agent, or Firm—Morgan & Finnegan

[57] ABSTRACT

A container truck, preferably a garbage-collecting truck, provided with a replaceable container which is connected by a releasable coupling to a tiltable frame which is pivotally movable by at least one first hydraulic fluid-operable piston-cylinder unit relative to the main frame of the chassis of the truck about a transverse axle, which axle connects the two frames and which axle is located at the rear end portion of the two frames. The container is movable along the tiltable frame on longitudinal tracks or on a slider for an extending movement toward the rear end of the truck or for a retracting movement toward the driver's cab of the truck by a second piston-cylinder unit. The truck also includes structure for switching the second hydraulic fluid-operable piston cylinder unit to a floating condition. The second fluid-operable piston-cylinder unit is connected through a plurality of lines to a directional valve, which, in addition to retracting and extending positions has a floating position in which the lines leading to the cylinder chambers are connected to each other and to a return line leading to a tank containing fluid under pressure. The line leading to the extending cylinder chamber contains a controllable non-return valve which prevents a return flow of fluid from that chamber and which is adapted to be deactivated by pilot lines for releasing the non-return valve when the second fluid-operable piston cylinder unit for moving the container on the tiltable frame is supplied with pressure fluid in an extending sense or the fluid-operating piston-cylinder unit for pivotally moving the auxiliary or tiltable frame is supplied with pressure fluid in a retracting sense.

3 Claims, 7 Drawing Sheets

GARBAGE-COLLECTING TRUCK HAVING A REPLACEABLE CONTAINER WHICH IS RECIRPROCABLY MOUNTED ON A TILTABLE FRAME

This is a continuation of co-pending application Ser. No. 07/370,332, filed on Jun. 22, 1989, now abandoned.

This invention relates to a garbage-collecting truck provided with a container which is replaceable. More particularly, the invention relates to a garbage-collecting truck provided with a replaceable container which is connected by releasable coupling means to a tiltable frame which is pivotally movable about a transverse axle by at least one first hydraulic fluid-operable piston-cylinder unit relative to the main frame of the truck chassis and which axle connects the two frames and is located at the rear end of the truck. The container mounted on longitudinal tracks or on a slider is movable on the tiltable frame and can be extended toward the rear end of the truck or retracted toward the driver's cab by a second piston-cylinder unit. The invention also comprises means for switching the second hydraulic fluid-operable piston-cylinder unit to a floating condition.

BACKGROUND OF THE INVENTION

A truck of the kind generally described is known from Published German Application 36 36 037 but it does not constitute a specific garbage-collecting truck. In the known truck, the control of the operation for picking up and setting down a container is simplified in that the container is first extended on a tiltable frame a predetermined distance beyond the tiltable frame by the second fluid-operable piston-cylinder unit. The tiltable frame is subsequently tilted and raised by actuation of the first fluid-operable piston-cylinder unit until the lower portion of the rear end of the container rests on the surface of a roadway or the like. The second fluid-operable piston-cylinder unit which slides the container on the auxiliary or tiltable frame is then switched to a floating position so that the tilting frame can be tilted by the first hydraulic cylinder without any special control until it moves second fluid-operable piston-cylinder unit to a vertical position. At the end of this operation the tiltable frame stands upright on its rear end. While the tiltable frame moves to the vertical position, the second hydraulic cylinder can be pushed outwardly or inwardly because it is in a floating condition. In the known container truck, the container is picked up and returned to its original position by a corresponding reverse operation.

In the known container truck, however, there is the danger that when the tiltable frame is in an oblique position the container may undesirably slip off over the rear end of the truck when the second fluid-operable piston-cylinder unit has been switched to a floating condition. There exists, therefore, a need for providing a container truck having a construction which does not exhibit such a dangerous disadvantage. The present invention fulfills such a need.

BRIEF SUMMARY OF THE INVENTION

In accordance with the invention there is provided a container truck of the kind described hereinabove and which is provided with means for preventing slippage of the container when the second extension-retraction fluid-operable piston-cylinder unit is in a floating condition.

In accordance with the invention, it is also possible to set the container down by the operation of only one valve by using a locking brake which is accessible from the outside of the truck, and to accomplish this without unduly straining the means for setting the container down.

These ends are accomplished in accordance with this invention in a container truck of the kind described hereinabove by providing a second fluid-operable piston-cylinder unit which comprises extending and retracting cylinder chambers and a directional valve connected thereto. In addition to retracted and extended positions, the second piston-cylinder unit has a floating position. Hydraulic lines are provided leading to the cylinder chambers as are return lines leading to a tank. The line leading to the extending cylinder chamber contains a controllable non-return valve which prevents the return flow of fluid back into that chamber and which valve is adapted to be bypassed by biasing lines for releasing the non-return valve when the second fluid-operable piston cylinder unit for moving the container o the tiltable frame is supplied with pressurized fluid to extend the container, or when the fluid-operable piston-cylinder unit for pivotally moving the auxiliary frame is supplied with pressurized fluid which pivoting movement causes the container to retract.

In order to set down and release a container from a container truck in accordance with the invention, the container is rearwardly displaced along the tilting frame until the closure flap of the container, disposed between the driver's cab and container, can be pivotally moved without obstruction past the driver's cab or the receiving and collecting space of the truck, that is, the so-called packer, (which is disposed behind the driver's cab of a garbage-collecting truck). The tilting frame can optionally be raised at the same time. When the container mounted on the now-extended tiltable frame is moved by activating the second fluid-operable piston-cylinder unit the rear bottom edge of the container will as a result of further pivotal movement of the tiltable frame touch the roadway or the ground, the second fluid-operable piston-cylinder unit should be switched to a floating condition. In this floating condition the non-return valve prevents backward hydraulic fluid flow, avoiding undesired slipping of the container which is otherwise caused by the action of gravity. Once the rear bottom edge of the container strikes the ground, further elevation of the tiltable frame causes the container to be retracted along the tiltable frame. Since the second fluid-operable piston-cylinder unit is still in the floating condition, the container can be raised further as the truck is backed up. The non-return valve does not interfere with the retracting movement of the container because it only prevents fluid flow in a direction which accompanies container extension. The truck brakes must have been released so that the truck can move rearwardly during further elevation of the tiltable frame, since as the container is lowered it pivots about one corner, moving the points where it is attached to the tiltable frame backward.

When a container which has been placed in a vertical position is to be picked up again by the container or garbage-collecting truck, the second fluid-operable piston-cylinder unit is substantially extended and the tiltable frame which is moved into the vertical position is then coupled to the container. When the first fluid-operable piston-cylinder units which pivotally move the tiltable frame are actuated, tilting the container, the pressure applied to the retracting cylinder chamber also releases the non-return valve so that the container can be pulled over the rear end of the frame while the second fluid-operable piston-cylinder unit in a floating condition. Thereafter, the second fluid-operable piston-cylinder unit is switched by the directional valve from its floating condition to its extending condition, moving the piston out from the cylinder and moving the container closer to the packer, so that the container can be moved without obstruction to its transport position on the truck.

In accordance with a further feature of the invention, an OR valve is provided which is connected to the extending cylinder chamber of the second fluid-operable piston-cylinder unit by a pilot line. This OR valve is also connected by a second pilot line to the retracting cylinder chambers of the first fluid-operable piston-cylinder unit. The non-return valve is thereby released when pressure is raised in either of the two pilot lines. Such an arrangement simplifies the hydraulic circuity because the non-return valve is deactivated by the same OR valve when the second fluid-operable piston-cylinder unit used to extending the piston rod while the tiltable cylinders pivotally move the tiltable frame toward the main frame while the second fluid-operable piston-cylinder unit is in its floating condition.

In accordance with a further feature of the invention, the control station for the hydraulic valve is disposed outside the driver's cab and is provided with means for releasing and applying the hand brake. The invention thereby permits the operator to actuate the truck's hand brake at the same time as he actuates the appropriate valve. This arrangement simplifies disposition and recovery of the container on a roadway or the like.

BRIEF DESCRIPTION OF THE DRAWINGS

In order to understand the invention more fully, reference is directed to the accompanying Drawings which are to be taken in conjunction with the detailed description of the invention set forth hereinbelow and in which Drawings.

DESCRIPTION OF THE PREFERRED EMBODIMENTS

Figure 1:
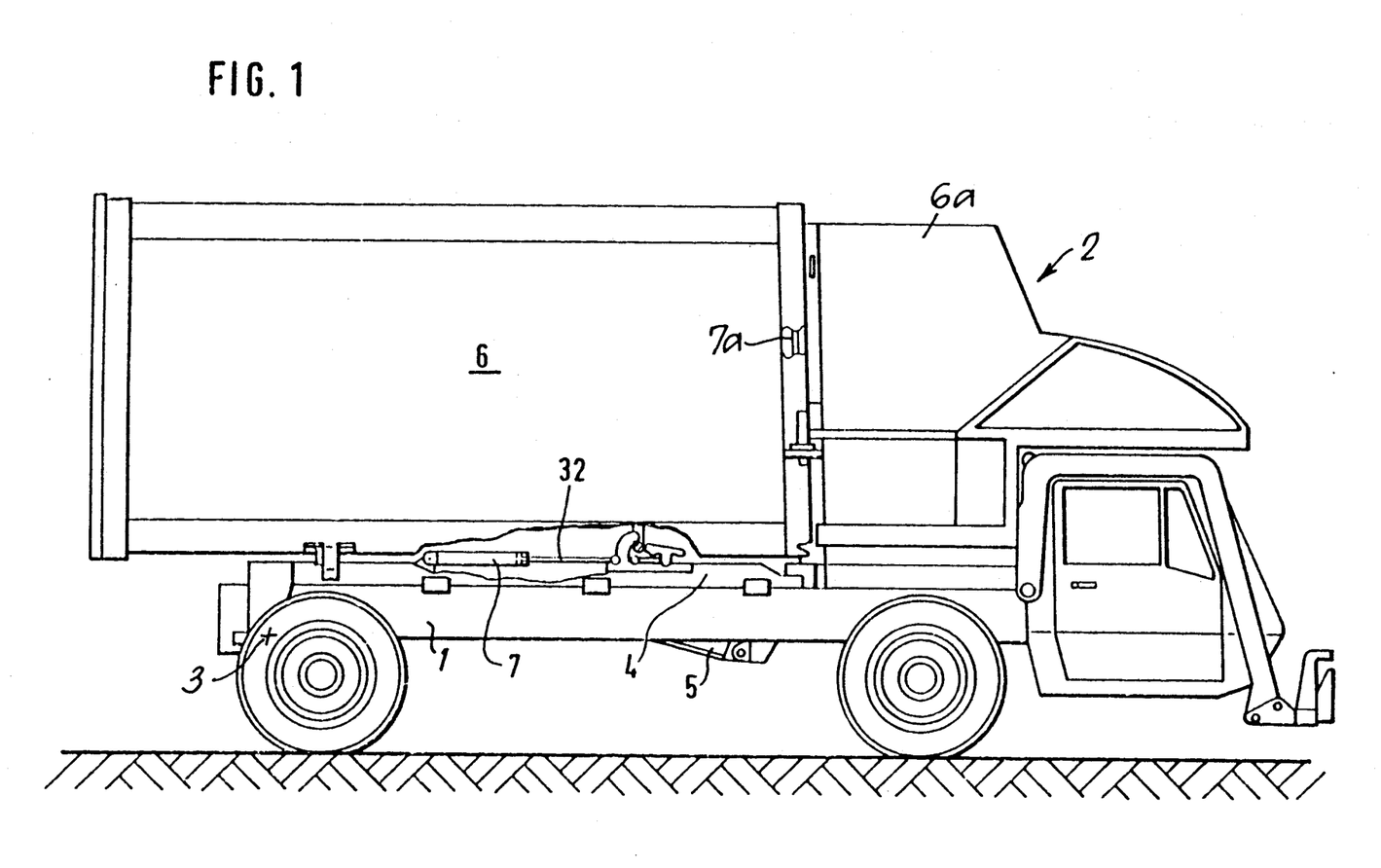
FIG. 1 is a lateral view in elevation and partially in section showing a garbage-collecting truck having a tiltable frame and a container which is reciprocable on the frame.
Figure 5:
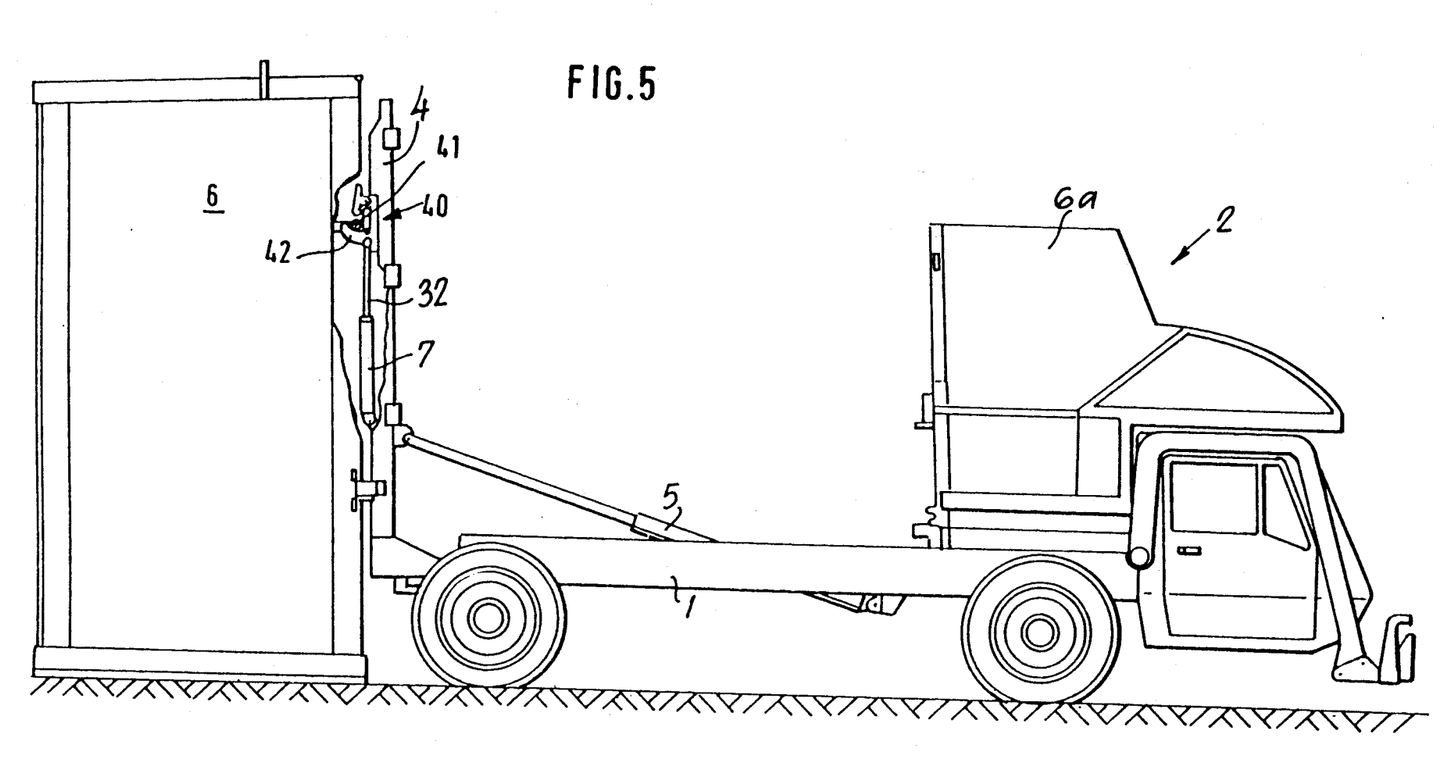
FIG. 5 shows the garbage-collecting truck of FIGS. 1 through 4 with the container standing on end in a vertical position and still coupled to the tiltable frame.

Referring now to FIG. 1, a container truck, such as a garbage-collecting truck, is shown according to the invention which truck comprises a tiltable frame 4 that is pivotally mounted on the transverse axle 3 attached to the chassis 1 of the garbage-collecting truck 2. The tiltable frame 4 is pivotally movable about axle 3 by the hydraulic fluid-operable piston-cylinder unit 5 between a position in which it lies horizontally on the chassis 1 and a position as shown in FIG. 5, in which it extends at right angles to the chassis 1. The container 6 is longitudinally movable on the tiltable frame 4 on tracks 4a located on the inside of the frame or on a similar disposed slider (not shown) and is reciprocable along the tiltable frame by a hydraulic piston-cylinder unit 7.

The fluid-operable piston-cylinder unit 7 that reciprocated the container 6 along the tiltable frame 4 comprises a piston rod 32, which is at its greatest extension when the container 6 is in a transport position, in which the container 6 is locked to the packer 6a.

Figure 2:
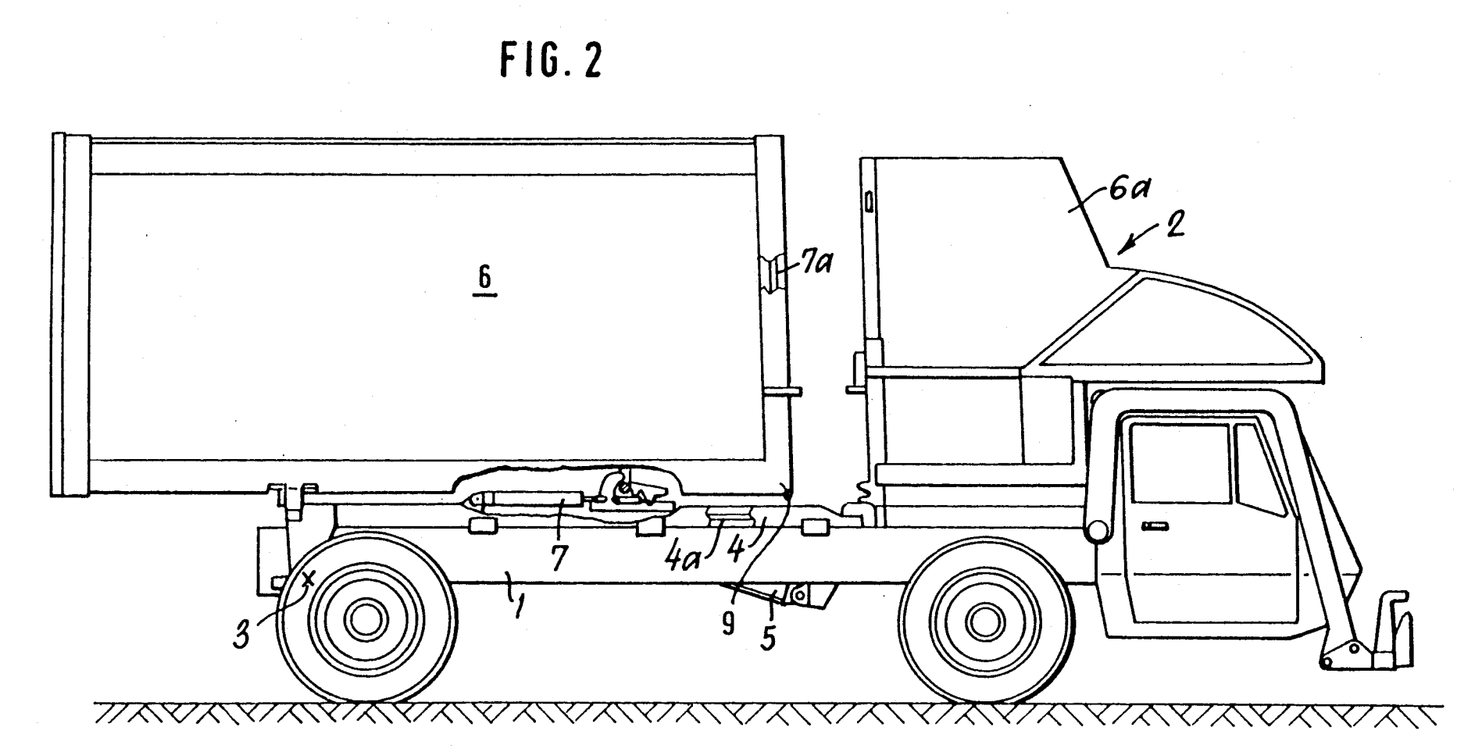
FIG. 2 is a view similar to FIG. 1 showing the garbage-collecting truck with the container pushed beyond the rear end of the truck.

When the container 6 is to be set down, it is first moved on the tiltable frame 4 from the position shown in FIG. 1 to the position shown in FIG. 2. The container 6 has been pushed rearwardly beyond the rear end of the truck to such an extent that the closure flap 7a provided in front wall of the container can be closed and the front bottom edge 9 of the container can pivotally move while not colliding with the packer as the tiltable frame 4 is tilted. As is apparent from FIG. 1, the piston rod 32 is almost entirely extended out of the cylinder of the fluid-operable piston-cylinder unit 7 when the container 6 is moved to the transport position (the container is "retracted"). The piston rod is almost entirely retracted into the cylinder when the container 6 is rearwardly moved to the position shown in FIG. 2 (the container is "extended").

Figure 3:
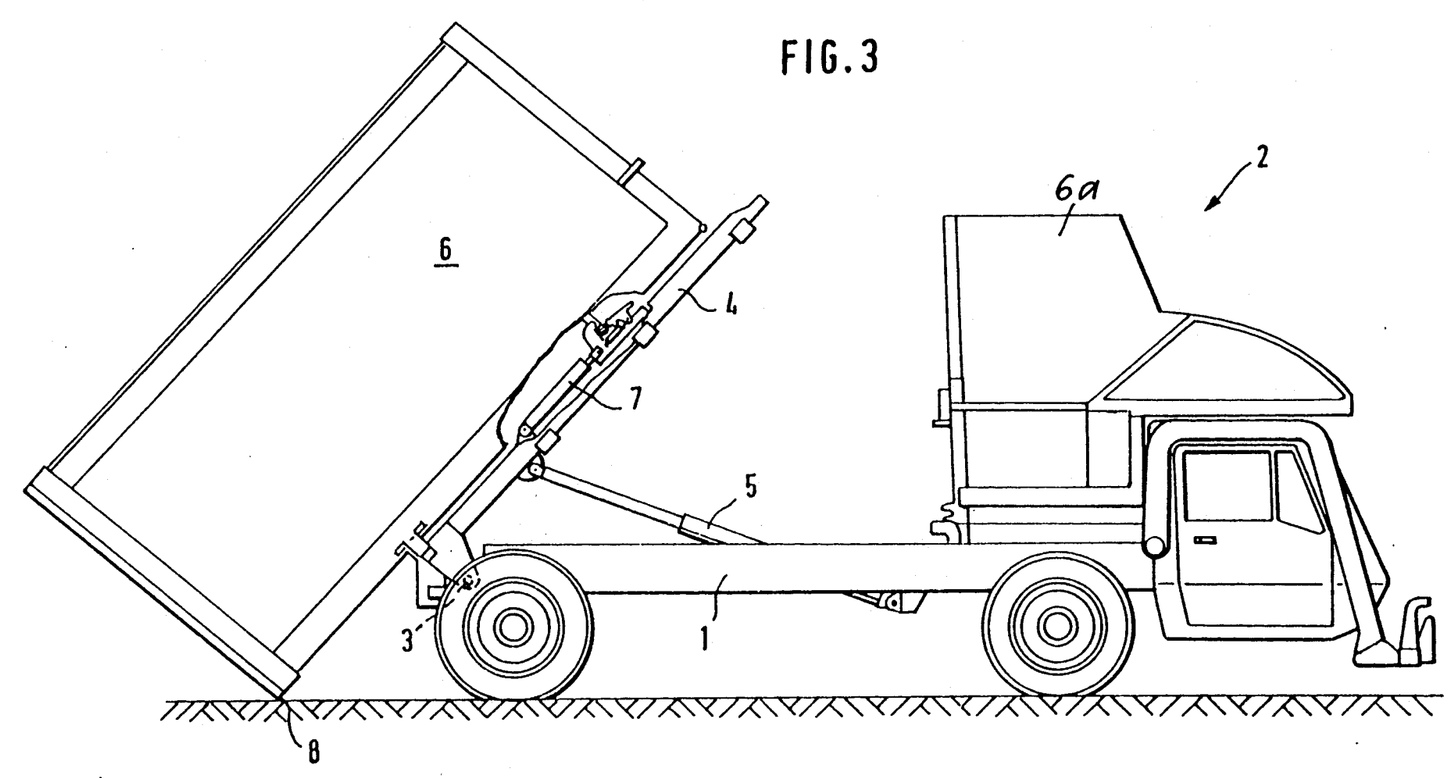
FIGS. 3 and 4 show the garbage-collecting truck of FIGS. 1 and 2 with the tiltable frame and the container in different positions, during the setting-down operation.

As soon as the container 6 has been extended to the rear on the tiltable frame 4 to the position shown in FIG. 2, the tiltable frame 4 is tilted upward by the fluid-operable piston-cylinder unit 5 until the rear bottom edge 8 of the container 6 touches the ground, as shown in FIG. 3. Since the fluid-operable piston-cylinder unit 7 has been switched to its floating condition, the tiltable frame 4 can be raised further by the fluid-operable piston-cylinder unit 5, displacing the container 6 along the tiltable frame 4 toward its retracted position. As soon as the rear bottom edge 8 of the container 6 touches the ground, the truck brake is released so that the truck 2 can roll backward to follow the displacement of the container 6 on the tiltable frame 4.

Figure 4:
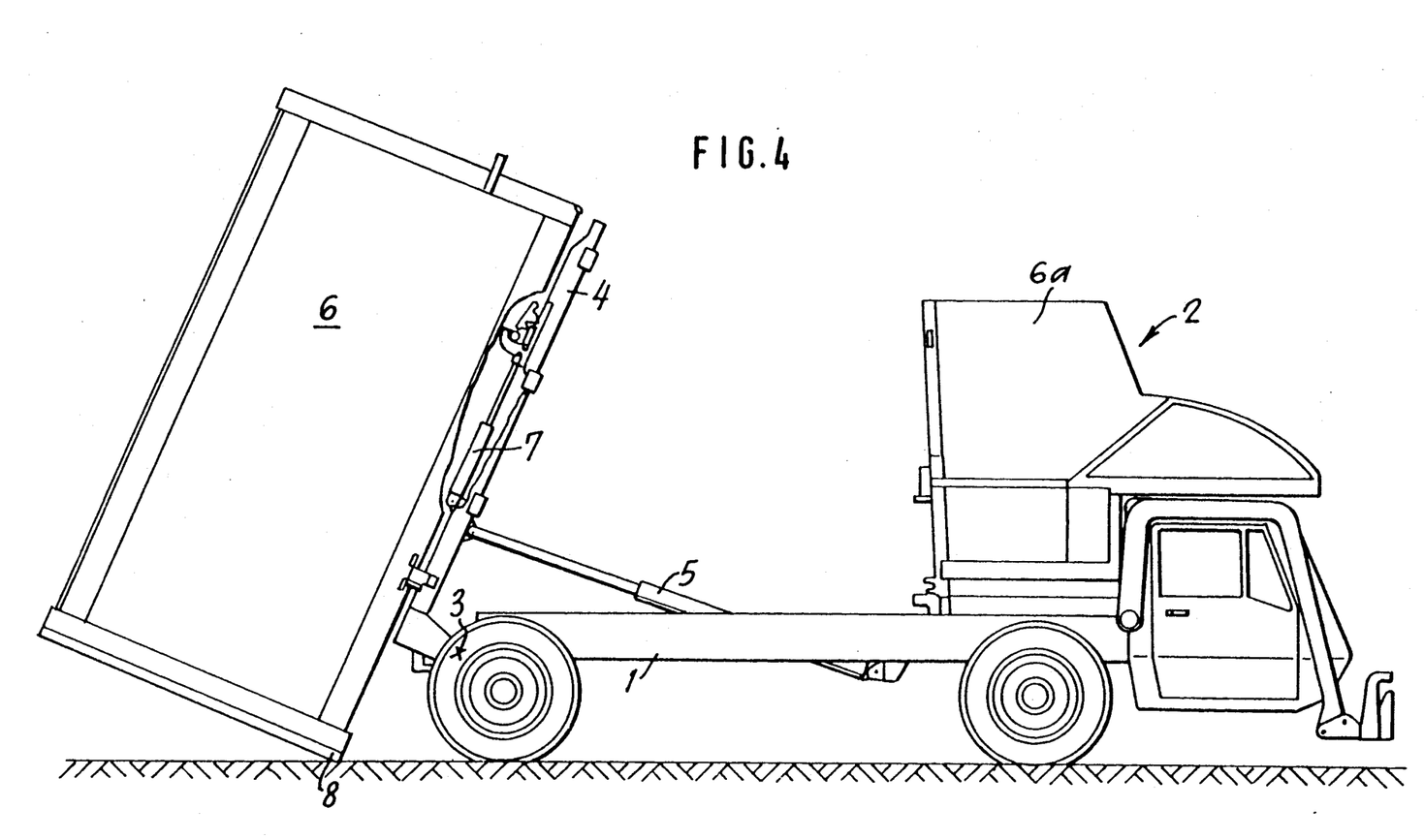

When the container 6 has been tilted past the position shown in FIG. 4 to the vertical position shown in FIG. 5, the container is unlocked and the garbage-collecting truck can move away.

When it is desired to pick up a container 6, the tiltable frame is swung to its vertical position shown in FIG. 5 after the fluid-operable piston-cylinder unit 7 has moved the locking means 40 to a position which corresponds approximately to the retracted position of the container.

Figure 6:
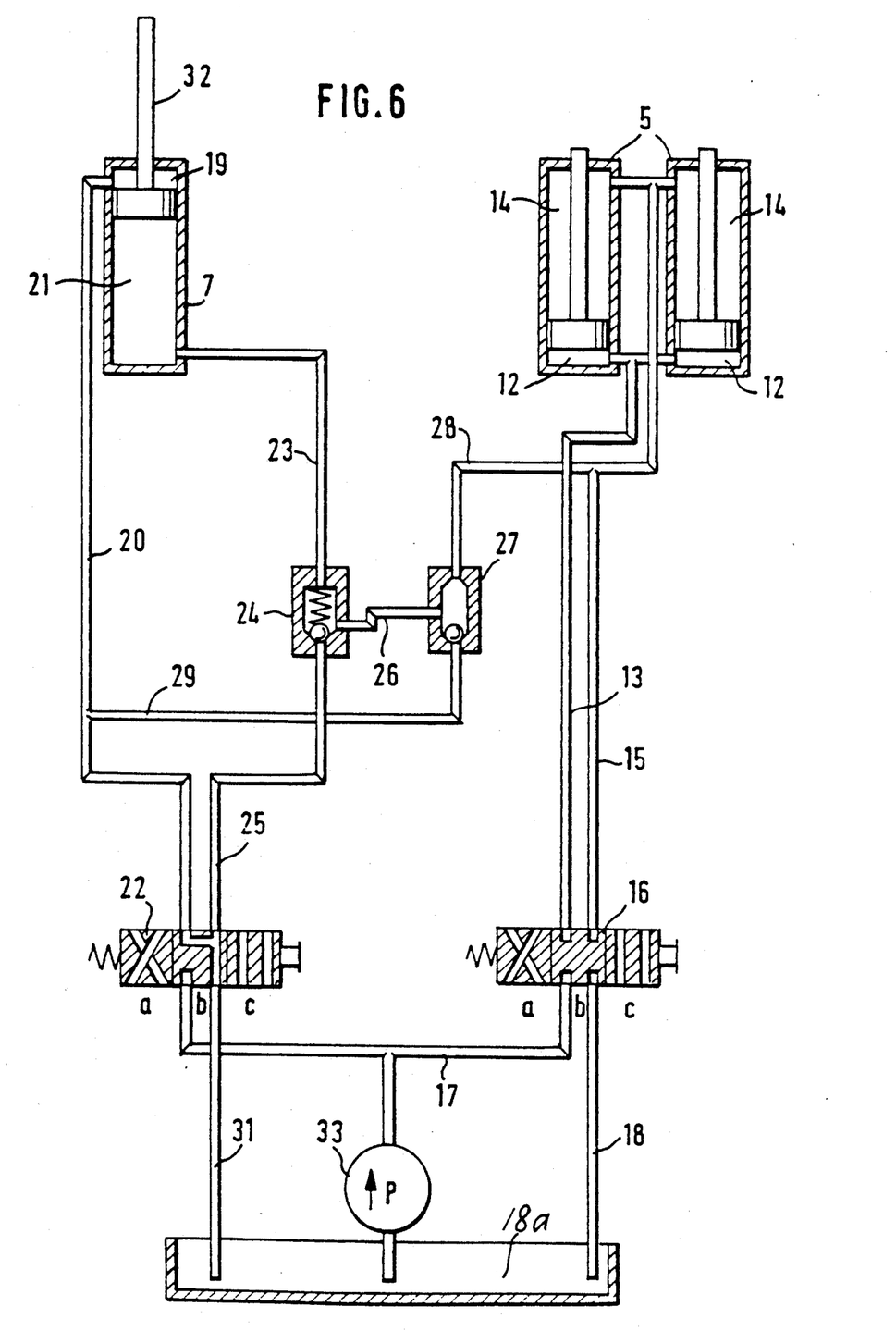
FIG. 6 is a diagrammatic representation of the hydraulic control system for the tilting and displacing cylinders.

As is apparent from FIG. 6, two tilting cylinders 5 are provided. The extending chambers 12 of the tilting cylinders 5 are connected to the hydraulic line 13 and the retracting chambers 14 are connected to the hydraulic line 15. The hydraulic lines 13 and 15 are connected to the directional valve 16, which is connected by the discharge line 17 to pump 33 and by the return line 18 to the tank 18a.

When pressurized fluid is supplied to the chamber 19 of the cylinder 7 the container 6 is extended so it overhangs the frame. Chamber 19 is connected to the control valve 22 by a hydraulic line 20. Chamber 21, which when pressurized, retracts the container, is connected by a hydraulic line 23 to the controllable non-return valve 24. The controllable non-return valve 24 is connected by a hydraulic line 25 to the directional valve 22. The controllable non-return valve 24 is adapted to be released when pressure is applied to line 26, which is connected to the OR valve 27. The OR valve 27 is connected by a pilot lines 28 and 29 to hydraulic lines 19 and 20. In its positions a and b, directional valve 22 reciprocates the piston rod 32 of the cylinder 7 so that in positions a and b the container on the tiltable frame 4 can be retracted toward the driver's cab and can be extended beyond the rear end of the truck, respectively.

When the directional valve 22 is in position b, cylinder 7 is in a floating condition, in which lines 20 and 25 are connected to each other and to the return line 31 leading to the tank 18a.

As is apparent from FIG. 2, the piston rod 32 of the cylinder 7 can be extended when that cylinder is in its floating condition so that the container 6 can then be moved toward its retracted position. Pressure is applied to the non-return valve 24 in the direction of flow. As the piston 32 moves out from the cylinder 7, fluid flows out from chamber 19 and around lines 20 and 23 into chamber 21. Directional valve 2 does not stop this because it only prevents the reverse flow of fluid. On the other hand, the non-return valve 24 prevents a lowering movement of the container (when the piston 32 moves into cylinder 7) preventing unintended slipping of the container from the inclined tiltable frame.

When the directional valve 22 is in position b, the piston rod 32 can be extended and the container can be retracted on the tiltable frame toward the driver's cab because in that position pressure is applied to the non-return valve in the allowable direction of flow.

During the retracting movement of the cylinder 5, that is, during the lowering of the tiltable frame toward the chassis, pressure may be supplied to the hydraulic line 15 so that pressure is applied to the OR valve via the control line 28 and, as a result, pressure is applied also to the control line 26 to release the controllable non-return valve 24. That release will be required when the cylinder 7 is in a floating condition and an upright container that has been coupled to the tiltable frame and is to be tilted to a horizontal position on the chassis. This is necessary because as the frame tilts downward and the container pivots about corner 8, the container 6 must extend along the frame.

When the container 6 is extended further beyond the rear end of the truck, the piston rod 32 is pushed into the cylinder with the directional valve 22 in position c. During the retracting movement of the piston rod 32 into the cylinder 7, pressure is supplied to the hydraulic line 20 so that pressure is applied also to the control line 29 and the control line 26 and the non-return valve 24 is thus released. In that position the hydraulic line 23 is connected to the return line 31.

When the cylinder 5 is extended while the piston-cylinder unit 7 is in its floating condition, the cylinder 5 will pivotally raise the tiltable frame 4. The dangerous and undesirable descent of container 6 is prevented by the non-return valve 24. When container 6 has touched the ground, the pivoting container 6 will pull the garbage-collecting truck 2 backward. In that case, the floating condition is desirable. The hydraulic pressure is applied to the non-return valve 24 in the direction of flow which occurs as the container 6 pivots.

A device is provided for releasing the truck's hand brake located adjacent to the control station for the hydraulic control valves, so that the truck brakes can be released at the proper time after the floating condition has been assumed and the rear bottom edge of the container has contacted the ground. An intermittently releasable brake may be provided, which comprises, a storage-spring brake cylinder, which permits a correspondingly tough controlled movement of the garbage-collecting truck.

Figure 7:
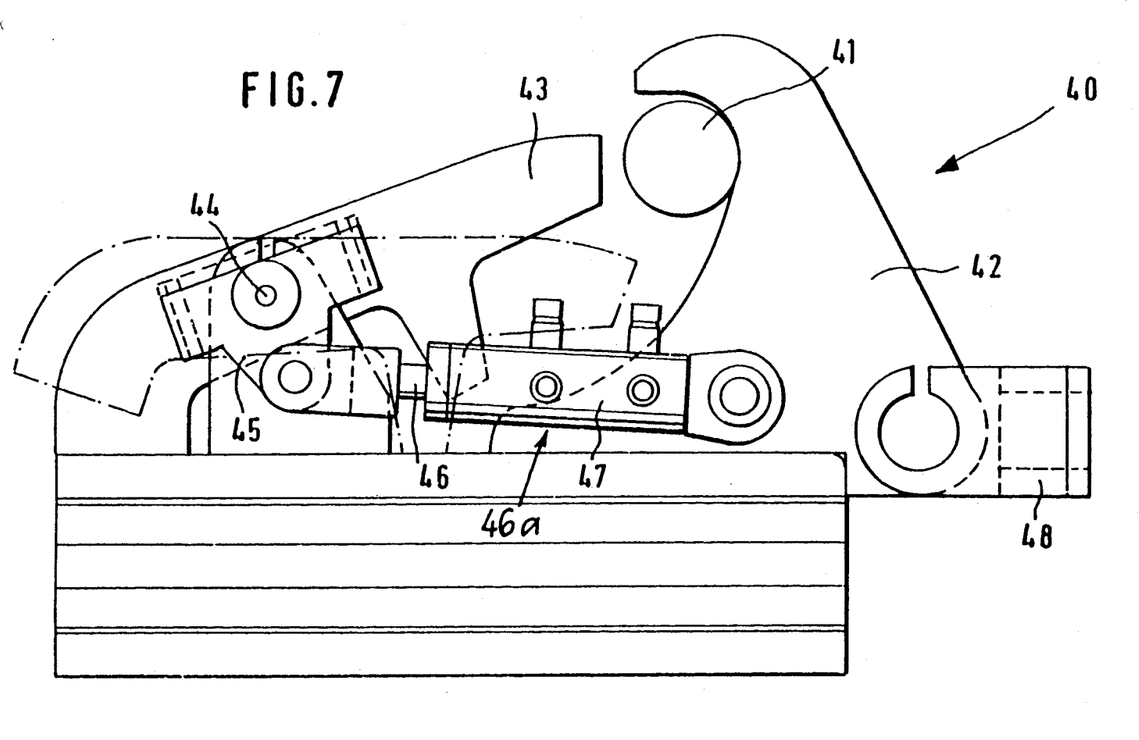
FIG. 7 is a lateral view in elevation and partially in section showing the locking device for locking the tiltable frame to the container.

Referring now to FIG. 7, there is shown there the locking device 40 for coupling the tracks or slider provided on the tiltable frame 4 to a pin 41 extending from container 6. The locking device consists of a hook 42, and an arm 43 which opposes the inner curved surface of hook 42, and, which arm 43 locks the pin 41 in the hook. The arm 43 is pivoted on tracks or slider about a transverse pivot 44. For pivotal movement of the arm 43 the transverse pivot 44 is provided with a projection 45, which constitutes a lever about axis 44 and to which the piston rod 46 of a hydraulic piston-cylinder unit 46a has been pivoted. The cylinder 47 of that unit is pivoted to the tracks or slider adjacent to the foot of the hook 48. The piston rod 32 of the cylinder 7 is linked by a connecting member 48 to the slider, which is movable in tracks.

What is claimed is:

1. A garbage-collecting truck comprising a replaceable container, which is connected by releasable coupling means to a tiltable frame having longitudinal tracks on sliding means, which frame is pivotally movable by at least one first hydraulic fluid-operable piston-cylinder unit relative to the main frame of the chassis of said truck about a transverse axle connecting the two frames, said axle being located at the rear end portion of the truck thereof, said container being movable on said tiltable frame along the longitudinal tracks on said sliding means for an extending movement toward the rear end of said truck and for a retracting movement toward the driver's cab of said truck by a second piston-cylinder unit and means for switching the second hydraulic fluid-operable piston-cylinder unit to a floating condition, characterized in that the second fluid-operable piston-cylinder unit is connected through a plurality of lines to a directional valve having retracting, extending and floating positions, and when in the floating position the lines leading to and from the cylinder chambers are connected to each other and then to a return line leading to a tank containing pressurized hydraulic fluid, the line leading to the extending cylinder chamber of said fluid-operable piston-cylinder unit containing a controllable non-return valve only allowing fluid flow in a single direction and thereby preventing a return flow of fluid from said chamber, said non-return valve being adapted to be bypassed whenever pressure is raised in a plurality of pilot lines, said non-return valve being released when said fluid-operable piston cylinder unit is supplied with pressurized fluid in an extending sense or when the fluid-operable piston-cylinder unit for pivotally moving said tiltable frame is supplied with pressurized fluid in a retracting sense whereby the container may be positioned in an erect position on the ground.

2. A garbage-collecting container truck according to claim 1 further comprising an OR valve which is connected by one of the pilot lines to an extending cylinder chamber of the second fluid-operable piston-cylinder unit and by another of said pilot lines to the retracting cylinder chambers of the first fluid-operable piston cylinder unit, said OR valve releasing the controllable non-return valve in response to a pressure applied to either of said pilot lines.

3. A garbage-collection container truck according to claim 1 further comprising a control station for controlling a directional valve which station is disposed outside the driver's cab of said truck and which station is provided with means for releasing and applying the hand brake of said truck.

* * * * *